(12) United States Patent  
Konolige

(10) Patent No.: US 7,194,126 B2
(45) Date of Patent: Mar. 20, 2007

(54) REALTIME STEREO AND MOTION ANALYSIS ON PASSIVE VIDEO IMAGES USING AN EFFICIENT IMAGE-TO-IMAGE COMPARISON ALGORITHM REQUIRING MINIMAL BUFFERING

(75) Inventor: Kurt Konolige, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 492 days.

(21) Appl. No.: 10/665,881

(22) Filed: Sep. 19, 2003

(65) Prior Publication Data

US 2005/0100207 A1 May 12, 2005

Related U.S. Application Data

(60) Division of application No. 09/395,905, filed on Sep. 10, 1999, now abandoned, which is a continuation of application No. 08/882,765, filed on Jun. 26, 1997, now abandoned.

(60) Provisional application No. 60/020,770, filed on Jun. 28, 1996.

(51) Int. Cl.
*G06K 9/00* (2006.01)

(52) U.S. Cl. .................................................... 382/154

(58) Field of Classification Search ................ 382/154; 348/42–43, 47, 49–50; 345/418–419
See application file for complete search history.

(56) References Cited

U.S. PATENT DOCUMENTS 5,179,441 A    1/1993   Anderson et al.
5,432,712 A    7/1995   Chan
5,577,130 A   11/1996   Wu

FOREIGN PATENT DOCUMENTS

EP       0 686 942       12/1995

OTHER PUBLICATIONS

Computational stereo, by Barnard et al., computing surveys, vol. 14, No. 4, Dec. 1982.*
A parallel stereo algorithm that produces dense depth maps and preserves image features, by Fua, machine viaion and applications (1993) 6:35-45.*

* cited by examiner

*Primary Examiner*—Vikkram Bali
(74) *Attorney, Agent, or Firm*—Beyer Weaver LLP

(57) ABSTRACT

A compact, inexpensive, real-time device for computing dense stereo range and motion field images, which are fundamental measurements supporting a wide range of computer vision systems that interact with the real world, where objects move through three-dimensional space includes a novel algorithm for image-to-image comparison that requires less storage and fewer operations than other algorithms. A combination of standard, low-cost and low-power components are programmed to perform algorithm and performs realtime stereo and motion analysis on passive video images, including image capture, digitization, stereo and/or motion processing, and transmission of results.

19 Claims, 8 Drawing Sheets

REALTIME STEREO AND MOTION ANALYSIS ON PASSIVE VIDEO IMAGES USING AN EFFICIENT IMAGE-TO-IMAGE COMPARISON ALGORITHM REQUIRING MINIMAL BUFFERING

CROSS-REFERENCE TO RELATED APPLICATIONS

This is a Divisional application of prior application Ser. No. 09/395,905 filed on Sep. 10, 1999 now abandoned which is a continuation of Ser. No. 08/882,765 filed on Jun. 26, 1997 (abandoned) claiming benefit of 60/020,770 filed on Jun. 28, 1996, the disclosure of which is incorporated herein by reference.

BACKGROUND OF THE INVENTION

1. Technical Field

The invention relates to electronic imaging. More particularly, the invention relates to real time stereo and motion analysis.

2. Description of the Prior Art

There are many applications for electronic vision systems. For example, robotic vehicles may be operable in both a teleoperated mode, where stereo cameras on board the vehicle provide three-dimensional scene information to human operators via stereographic displays; and a semi-autonomous mode, where rangefinders on board the vehicle provide three-dimensional information for automatic obstacle avoidance.

Stereo vision is a very attractive approach for such electronic vision applications as on-board rangefinding, in part because the necessary video hardware is already required for teleoperation, and in part because stereo vision has a number of potential advantages over other rangefinding technologies, e.g. stereo is passive, nonscanning, non-mechanical, and uses very little power.

The practicality of stereo vision has been limited by the slow speed of existing systems and a lack of consensus on basic paradigms for approaching the stereo problem. Previous stereo vision work has been grouped into categories according to which geometric model of the world was employed, which optimization (i.e. search) algorithms were employed for matching, and which constraints were imposed to enhance the reliability of the stereo matching process.

Primary approaches to geometry have used either feature-based or field-based world models:

Feature-based models typically extract two-dimensional points or line segments from each image, match these, and output the parameters of the corresponding three-dimensional primitives.

Field-based models consist of discrete raster representations. In particular, a disparity field that specifies stereo disparity at each pixel in an image.

Field-based models typically perform matching by area correlation. A wide variety of search algorithms have been used, including dynamic programming, gradient descent, simulated annealing, and deterministic, iterative local support methods. Coarse-to-fine search techniques using image pyramids can be combined with most of these methods to improve their efficiency. Finally, many sources of search constraint have been used to reduce the likelihood of false matches, including multispectral images, surface smoothness models, and redundant images, such as in trinocular stereo or motion-based bootstrap strategies.

Statistical modeling and estimation methods are increasingly used in both feature-based and field-based models. The use of surface smoothness models, which is known to be effective in practice, fits image information into a statistical framework based upon a relationship to prior probabilities in Bayesian estimation. The power of coarse-to-fine search, redundant images, and active or exploratory sensing methods are all well known.

A basic issue is the question of which type of feature-based or field-based model provides the most general approach to stereo vision. The roots of stereo vision lie in the use of area correlation for aerial triangulation. In the past, correlation was thought to be too slow or to be inappropriate for other reasons. As a result, methods based on edges or other types of features became popular. However, feature-based methods also have limitations due to feature instability and the sparseness of estimated range images.

Another important issue is which combination or combinations of search algorithms and constraints provides the most efficient and reliable performance. Global search algorithms, such as simulated annealing and three-dimensional dynamic programming, may give accurate results but they are very expensive computationally. Analogously, multi-spectral or redundant images provide more information, but increase the hardware and computational cost of a system. It is likely that comparatively simple methods may lead to fast and usually reliable performance, as described in H. K. Nishihara, *Practical Real-Time Imaging Stereo Matcher*, Optical Engineering, volume 23, number 5 (September/October 1984).

U.S. Pat. No. 4,905,081 to Morton discloses a method and apparatus for transmitting and receiving three-dimensional video pictures. Transmission of video pictures containing depth information is achieved by taking video signals from two sources, showing different representations of the same scene, and correlating them to determine a plurality of peak correlation values which correspond to vectors representing depth information. The first video signal is divided into elementary areas and each block is tested, pixel by pixel, with each vector to determine which vector gives the best fit in deriving the second video signal from the first. The vectors that give the best fit are then assigned to their respective areas of the picture and constitute difference information. The first video signal and the assigned vectors are then transmitted in parallel. The first video signal can be received as a monoscopic picture, or alternatively the vectors can be use to modified the first signal to form a display containing depths.

Morton discloses a method that provides a remote sensing technique for use, for example, with robots in hazardous environments. Such robots often use stereoscopic television to relay a view of their surroundings to an operator. The technique described by Morton could be used to derive and display the distance of an object from a robot to avoid the need for a separate rangefinder. For autonomous operation of the robot, however, information concerning the distance to a hazardous object in the environment of the robot must be available in near real-time.

The slow speed of prior art stereo vision systems has posed a major limitation, e.g. in the performance of semi-autonomous robotic vehicles. Semi-autonomy, in combination with teleoperation, is desired for many tasks involving remote or hazardous operations, such as planetary exploration, waste cleanup, and national security. A major need has been a computationally inexpensive method for computing range images in near real time by cross-correlating stereo images.

C. Anderson, L. Matthies, *Near Real-Time Stereo Vision System*, U.S. Pat. No. 5,179,441 (Jan. 12, 1993) discloses an apparatus for a near real-time stereo vision system that is used with a robotic vehicle that comprises two cameras mounted on three-axis rotation platforms, image-processing boards, and a CPU programmed with specialized stereo vision algorithms. Bandpass-filtered image pyramids are computed, stereo matching is performed by least-squares correlation, and confidence images are estimated by means of Bayes' theorem.

In particular, Laplacian image pyramids are built and disparity maps are produced from a 60×64 level of the pyramids at rates of up to 2 seconds per image pair. All vision processing is performed by the CPU board augmented with the image processing boards.

Anderson et al disclose a near real-time stereo vision apparatus for use with a robotic vehicle that comprises a first video camera, attached to mounting hardware for producing a first video output image responsive to light from an object scene; and a second videocamera, also attached to the mounting hardware for producing a second video output image responsive to light from the object scene; a first digitizer for digitizing the first video image having an input connected to an output of the first videocamera, and having an output at which digital representations of pixels in the first video image appear; a second digitizer for digitizing the second video image having an input connected to an output of the second video camera, and having an output at which digital representations of pixels in the second video image appear; a video processor for successively producing sequential stereo Laplacian pyramid images at left and right stereo outputs thereof from the digital representations of the first and second video images at first and second inputs connected to the outputs of the first and second digitizers; a stereo correlation means for correlating left and right stereo Laplacian pyramid images at the left and right stereo outputs of the video processor, where the stereo correlation means have an output and first and second inputs connected to the left and right inputs of the video processor; a disparity map calculator connected to the output of the stereo correlation means, for calculating a disparity map of the object scene; and means for storing an array of numerical values corresponding to the stereo disparity at each pixel of a digital representation of the object scene.

Zabih, R. And J. Woodfill, *Non-parametric local transforms for computing visual correspondence,* 3rd European Conference on Computer Vision, Stockholm (1994) disclose the use of non-parametric local transforms as a basis for performing correlation. Such non-parametric local transforms rely upon the relative ordering of local intensity values, and not on the intensity values themselves. Correlation using such transforms is thought to tolerate a significant number of outliers. The document discusses two non-parametric local transforms, i.e. the rank transform, which measures local intensity, and the census transform, which summarizes local image structure.

In view of the various shortcomings associated with the prior art, as discussed above, it would be advantageous to provide a new algorithm for image-to-image comparison that requires less storage and fewer operations than other algorithms. It would be of additional advantage to provide a hardware/software electronic vision solution having an implementation that is a combination of standard, low-cost and low-power components programmed to perform such new algorithm.

SUMMARY OF THE INVENTION

The invention provides a small vision module (SVM), which is a compact, inexpensive, real-time device for computing dense stereo range and motion field images. These images are fundamental measurements supporting a wide range of computer vision systems that interact with the real world, where objects move through three-dimensional space. A key feature of the SVM is a novel algorithm for image-to-image comparison that requires less storage and fewer operations than other algorithms, and yet it is at least as effective.

The hardware/software implementation of the SVM is a combination of standard, low-cost and low-power components programmed to execute this new algorithm. The SVM performs realtime stereo and motion analysis on passive video images. It is a complete system, including image capture, digitization, stereo and/or motion processing, and transmission of results.

Two of the unique properties of the invention include:

A novel algorithm that is used for the processing of stereo and motion image information. In the preferred embodiment of the invention, this algorithm is a space and time efficient implementation of the Laplacian of Gaussian (LOG) method.

Some alternatives to the LOG method include Sum of Squared Differences (JPL), Laplacian Level Correlation (TELEOS), Normalized Sum of Squared Differences (SRI, others), and Census. Generally, the LOG method is more computationally efficient than these methods, while providing comparable results.

The herein described algorithm has at least the following advantages, inter alia:

It produces a dense set of result values. Some other methods, such as Teleos', produce sparse results.

It is more space-efficient than other algorithms because it requires only a small set of storage buffers, plus the two images, for processing. This reduces the overhead of any hardware implementation to date, and also increases speed by using more local references.

It is more time-efficient than other algorithms because, in the preferred embodiment of the invention, it has an inner loop that requires only four operations per pixel per disparity.

It uses a unique confidence measure, i.e. summed edge energy, to determine when stereo readings are reliable.

It should be emphasized that, although the algorithm was developed using the LOG method, it can also be used with other correlation methods, especially the Sum of Squared Differences, or Census methods.

A second unique property of the invention is the hardware implementation thereof. By combining commercially available single-chip cameras, low-power A/D converters, and a fast DSP processor, the invention provides a device that performs realtime analysis of images in a very small footprint using very little power.

There is no other operational system for realtime stereo or motion analysis that uses so little computational power. For example, TELEOS' AVP system uses a PENTIUM 133 MHz processor, special video capture boards with processing features, and associated memory and disk to achieve comparable results. While JPL system is small and low-power, it is an order of magnitude slower than the method and apparatus described herein.

DETAILED DESCRIPTION OF THE INVENTION

Figure 1:
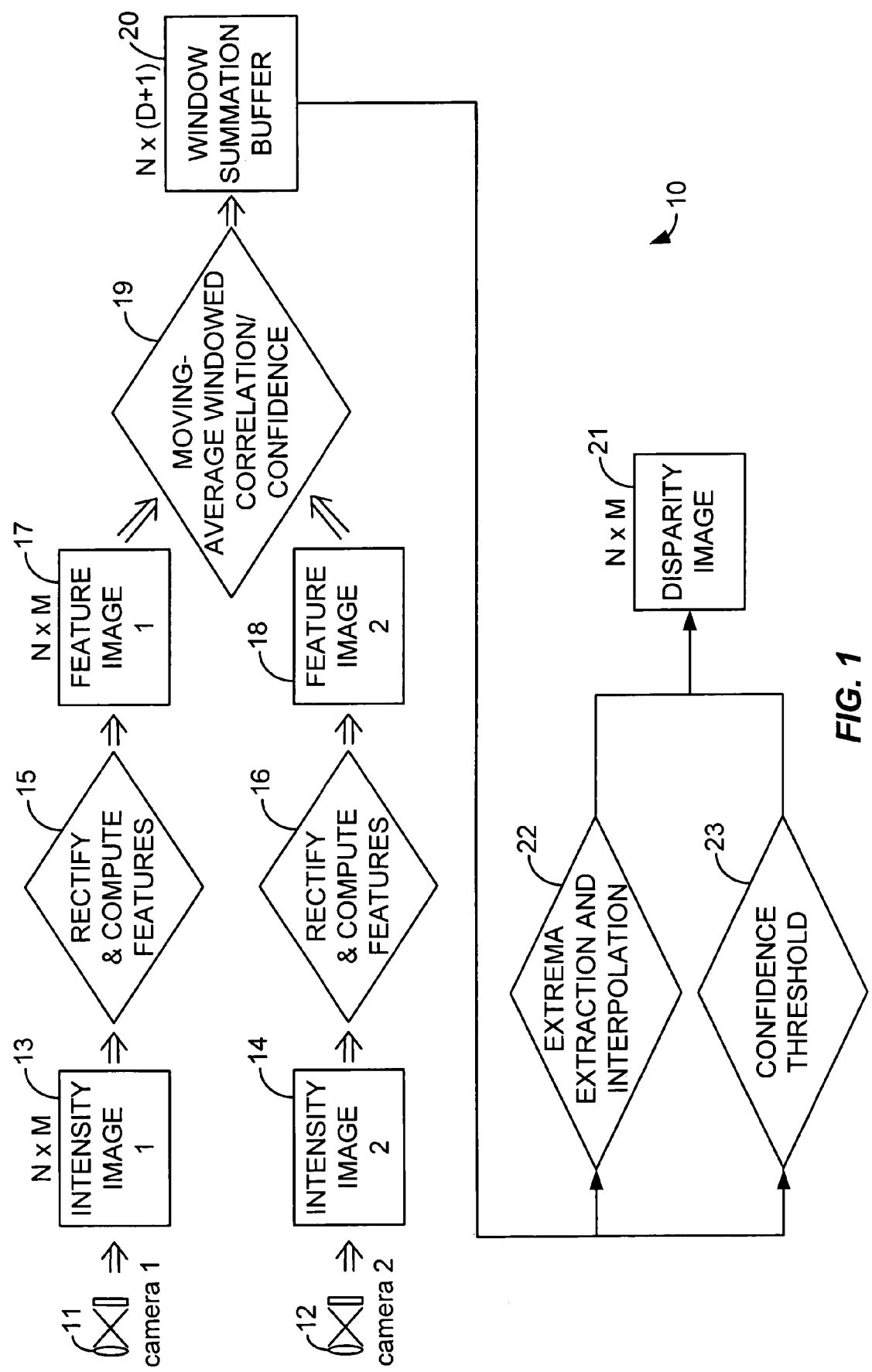
FIG. 1 is a block diagram showing a preferred implementation of the novel algorithm for the small vision module according to the invention.

The invention provides a small vision module (SVM), which is a compact, inexpensive, real-time device for computing dense stereo range and motion field images. These images are fundamental measurements supporting a wide range of computer vision systems that interact with the real world, where objects move through three-dimensional space. A key feature of the SVM is a novel algorithm for image-to-image comparison that requires less storage and fewer operations than other algorithms, and yet it is at least as effective.

The hardware/software implementation of the SVM is a combination of standard, low-cost and low-power components programmed to execute this new algorithm. The SVM performs realtime stereo and motion analysis on passive video images. It is a complete system, including image capture, digitization, stereo and/or motion processing, and transmission of results.

Two of the unique properties of the invention include:

A novel algorithm that is used for the processing of stereo and motion image information. In the preferred embodiment of the invention, this algorithm is a space and time efficient implementation of the Laplacian of Gaussian (LOG) method.

Some alternatives to the LOG method include Sum of Squared Differences (JPL), Laplacian Level Correlation (TELEOS), and Normalized Sum of Squared Differences (SRI, others), and census. Generally, the LOG method is more computationally efficient than these methods, while providing comparable results.

The herein described algorithm has at least the following advantages, inter alia:

It produces a dense set of result values. Some other methods, such as Teleos', produce sparse results.

It is more space-efficient than other algorithms because it requires only a small set of storage buffers, plus the two images, for processing. This reduces the overhead of any hardware implementation to date, and also increases speed by using more local references.

It is more time-efficient than other algorithms because, in the preferred embodiment of the invention, it has an inner loop that requires only four operations per pixel per disparity.

It uses a unique confidence measure, i.e. summed edge energy, to determine when stereo readings are reliable.

It should be emphasized that, although the algorithm was developed using the LOG method, it can also be used with other correlation methods, especially the Sum of Squared Differences, and census methods.

A second unique property of the invention is the hardware implementation thereof. By combining commercially available single-chip cameras, low-power A/D converters, and a fast DSP processor, the invention provides a device that performs realtime analysis of images in a very small footprint using very little power.

There is no other operational system for realtime stereo or motion analysis that uses so little computational power. For example, TELEOS' AVP system uses a PENTIUM 133 MHz processor, special video capture boards with processing features, and associated memory and disk to achieve comparable results. While JPL system is small and low-power, it is an order of magnitude slower than the method and apparatus described herein.

1. Algorithm

The algorithm takes two intensity images as input, and produces an output image consisting of a disparity for each image pixel. The output is further post-processed to give a measure of confidence for each result pixel, and thresholded based on image noise characteristics.

FIG. 1 shows the basic data structures and functional blocks of the algorithm employed in the embodiment of the invention that provides a small vision module (SVM) 10. In the first part of the SVM, two cameras 11, 12 having associated imaging sensors produce digital intensity images 13, 14, i.e. images represented by an array N×M of numbers, where each number corresponds to the intensity of light falling on that particular position in the array. Typically, the numbers are eight bits in precision, with zero representing the darkest intensity value and 255 the brightest. Typical values for N (the width of the image) and M (the height of the image) are 320×240 or 640×480.

The two images to be correlated may come either from two different cameras separated spatially that capture images at the same time, or from the same camera capturing two successive images at different times. In the first case, a stereo disparity image is produced as the result of the algorithm, and in the second case a motion disparity image is produced. In either case, the processing is identical, except for the search region of the correlation operation.

The first step in the algorithm is to rectify 15, 16 the images and compute a feature image 17, 18. This is done on each intensity image separately. Rectification is the process whereby an original intensity image is mapped to a rectified image, i.e. an image whose epipolar lines are horizontal. The features are computed on the rectified images. For the SVM algorithm, the preferred embodiment of the invention uses the Laplacian of Gaussian (LOG) feature. Other features could also be used.

One of the unique features of the SVM algorithm is that rectification and feature extraction are combined into a single operation, rather than being carried out as successive operations. This is described in detail below.

The output of the first step is two feature images 17, 18, each of approximately the size of the original images. Because the second step (the correlation algorithm) works on successive lines of the feature images, it is necessary to buffer only YCORR+1 lines of the feature image, where YCORR is the height of the correlation window. This is due, at least in part, to the fact that the algorithm includes a novel correlation technique (discussed below) that significantly reduces feature buffer size requirements, such that the feature buffers only need include a minimal amount of information, e.g. it is unnecessary to buffer old correlation results, as is required in prior approaches. As a result, memory requirements and device size are substantially reduced by use of the herein described algorithm.

Also, the first and second steps can proceed in parallel, with the correlation step occurring for each feature image line after it is computed by the first step.

The second step is the correlation step 19. Correlation operates on successive lines of the feature images, updating the window summation buffer. The correlation step compares the feature values over a window of size XCORR× YCORR in feature image 1 to a similar window in feature image 2, displaced by an amount referred to as the disparity.

The window summation buffer 20 has size N×(D+1), where D is the number of different search positions (disparities) that are checked for each pixel in the feature images. For each disparity 0<=d<D there is a line of size N in the buffer, where each value in the line is the correlation of the window centered on the corresponding pixel in feature image 1, to the window centered on the corresponding pixel offset by the disparity d in feature image 2. For stereo, the disparity offset in feature image 2 is along the same horizontal line as in feature image 1; for motion, it is in a small horizontal, vertical, and/or diagonal neighborhood around the corresponding pixel in feature image 2.

At the same time as the correlation step is proceeding, a confidence value is also computed by summing an interest operator over the same correlation window. The results of the interest operator for each new line are stored in one line of the window summation buffer. In the presently preferred embodiment of the invention, the interest operator may be:

$$|LOG| \qquad (1)$$

The third step in the algorithm is the calculation of the disparity result image 21. A first calculation performs an extrema extraction 22 to find the minimum summed correlation value. This picks out the disparity of the best match.

A post processing calculation provides a filter that produces an interpolated sub-pixel disparity. The post processing calculation eliminates some disparity results as low-confidence 23, on the basis of thresholded confidence values from the calculation of the second step discussed above. A left-right consistency check is also performed on the window summation buffer. This check is computationally inexpensive due to the structure of the buffer (discussed above).

The end result of the algorithm is an image 21 of disparity values of approximately the size of the original images, where each pixel in the disparity image is the disparity of the corresponding pixel in intensity image 1.

Figure 2:
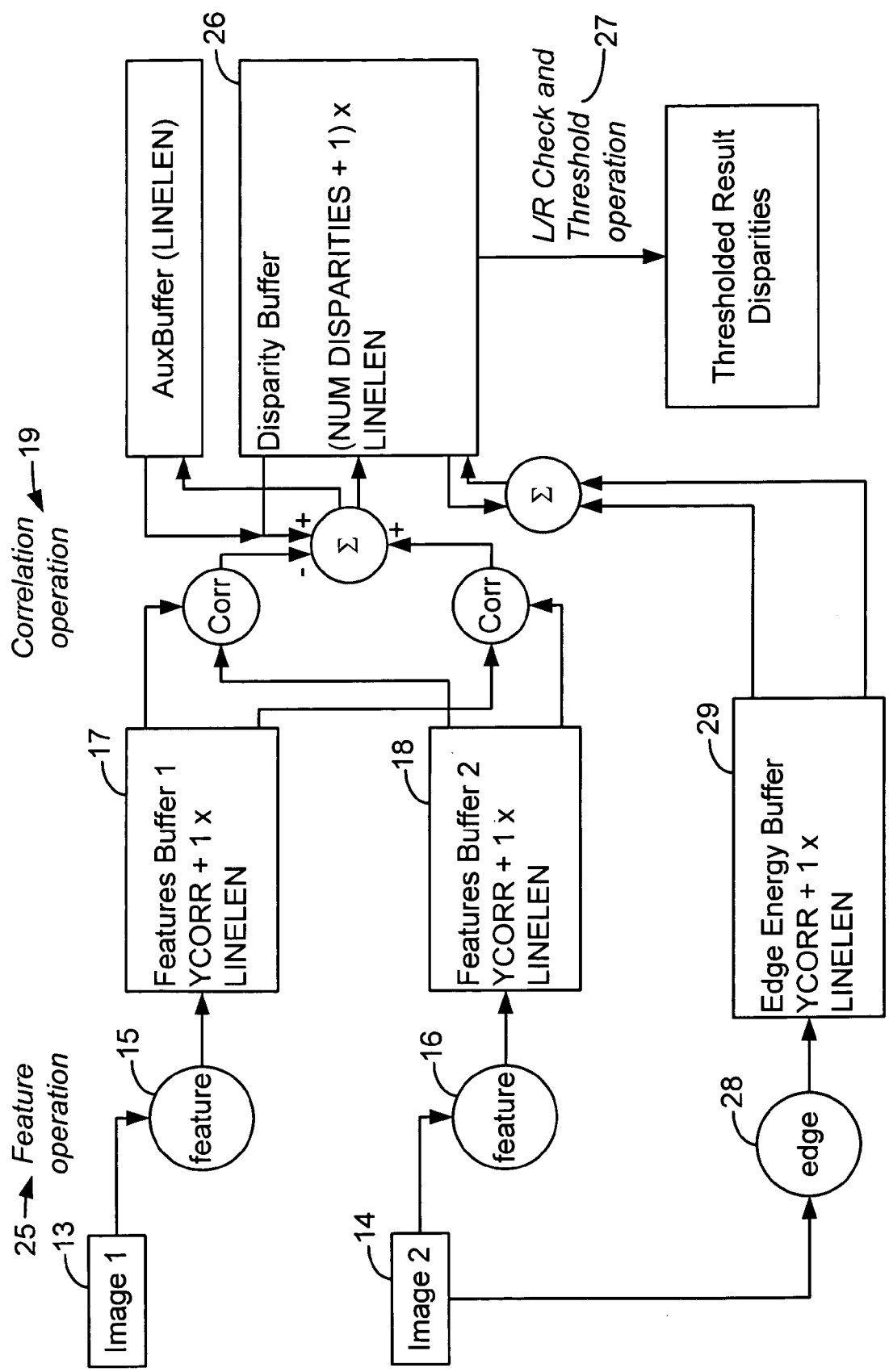
FIG. 2 is a is a more detailed block diagram showing a preferred implementation of the novel algorithm for the small vision module of FIG. 1 according to the invention.

The block schematic diagram of FIG. 2 shows the basic operations of the algorithm for a single line of the result. During the feature operation 25, two images are input, either a stereo pair or two time-successive images. A feature operator is applied over an X×Y window to compute a result for every pixel. YCORR+1 lines of feature results are stored in the feature buffer 17, 18.

The two images are correlated by comparing the feature values over an XCORR by YCORR window, where typical values are XCORR, YCORR=11. As a new line is added to the feature buffers, the correlation window is computed incrementally for each disparity by subtracting results from the oldest line, and adding in the results of the newest line. Results from these two lines are also computed incrementally, by moving an XCORR-size window over each line.

The incremental calculation is repeated for each disparity value, shifting the images appropriately. Results are accumulated in the disparity buffer 26. This buffer holds the disparity value result lines, arranged as a 2-dimensional matrix. A left/right consistency check 27 is performed by iterating over each column of the matrix to find the maximum value, and then comparing it to the maximum in a diagonal line passing through that value.

In a separate but similar incremental calculation, the edge energies 28, as stored in an edge energy buffer 29, are summed over the same correlation window 26. The preferred edge energy value is the absolute value of the LOG. The summed value is checked against a noise threshold for the image, and disparity results at pixels with values less than the threshold are discarded.

The single-line algorithm is repeated for each image line. Space requirements for the algorithm are given in the boxes of FIG. 2, and are summed up here:

$$(3*YCORR+D+6)16\text{-bit words} \qquad (2)$$

where YCORR is the Y-size of the correlation window, and is the number of disparities.

Algorithm processing time is dominated by the inner-loop calculation of disparity correlations. If C is the number of operations required to perform one correlation between feature values, then this time is:

$$4*C \text{ operations per pixel per disparity} \qquad (3)$$

When implemented in hardware, as described below in connection with the preferred embodiment of the invention, the processing time is 240 nanoseconds per pixel per disparity. This yields a raw rate of about 10 fps of 160×100 stereo or motion results using 16 disparities. The overhead of census operations and UR check brings this value down to 8.3 fps in actual tests.

2. Rectification and Feature Computation

The intensity images that come from the stereo cameras, or from successive images of a single camera, are not suitable for correlation in their original form. There are many reasons for this, e.g. lighting biases that differ between the images, distortions introduced by the lenses, and image plane geometry. Compensation for geometric distortions is possible by rectifying the original images. This process maps the original image into a warped image in which epipolar lines (the possible geometric correspondence of a point in one image to points in the other) are horizontal.

The concept of epipolar lines and the warping equations that produce rectified images are well-known in the prior art (see, for example, P. Fua, *A parallel stereo algorithm that produces dense depth maps and preserves image features*, Machine Vision and Applications (1993) 6:35–49). The warping equations give the coordinates of the source pixel (ri, rj) corresponding to the destination pixel (i,j). In practice, a small neighborhood around (ri, rj) is averaged to compute the value for the pixel at (i,j). Subsequently, a feature operator is applied to each pixel neighborhood of the rectified image to produce a feature image.

In the algorithm, different feature operators may be employed, e.g. the Laplacian of Gaussian (LOG) operator. General descriptions of this and other operators are in the open literature (see, for example C. Anderson, L. Matthies, *Near Real-Time Stereo Vision System*, U.S. Pat. No. 5,179, 441 (Jan. 12, 1993); and R. Zabih, J. Woodfill, *Non-parametric Local Transforms for Computing Visual Correspondence*, Lecture Notes in Computer Science, Vol. 801, pp. 151–158, Computer Vision—ECCV '94 (1994) (which describes a census operator)).

Figure 3A:
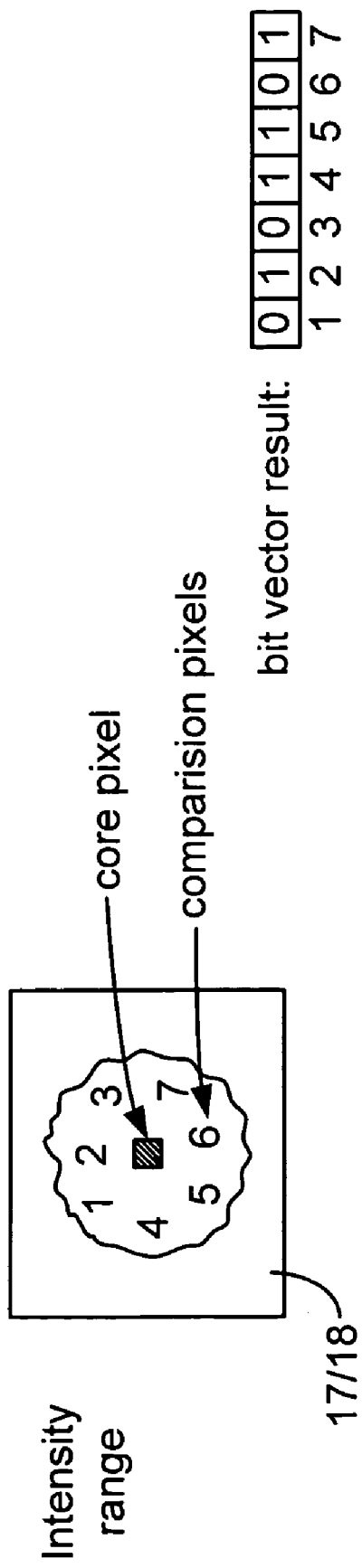
FIG. 3 is a flow diagram that provides a description of a census operator.

The census operator described by Zabih supra computes a bit vector by comparing a core pixel to some set of pixels in its immediate neighborhood (see FIG. 3a). If pixel 1 is greater in intensity than the core, then position 1 of the bit vector is 1, otherwise it is 0. Other bits of the vector are computed in a similar manner. Note that the set of comparison pixels is typical sparse, that is, not every pixel is compared.

Figure 3B:
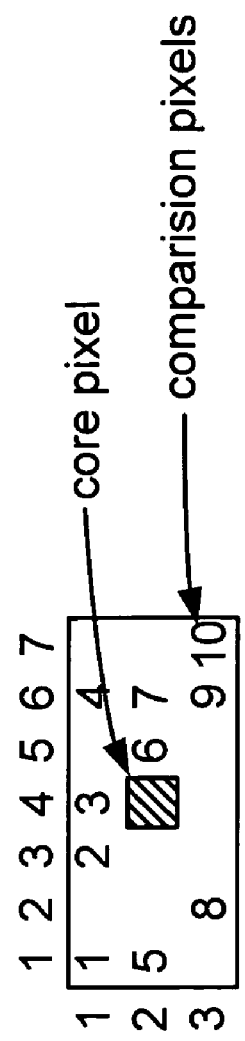

The particular pattern that is used is important for the quality of the correlations that are performed later. One census pattern that may be used for the SVM algorithm is shown in FIG. 3b. This pattern uses ten bits for the result, while keeping the good performance characteristics of larger patterns. The smaller number of bits means that fewer operations need to be performed, and smaller lookup tables can be used, with a consequent gain in storage and computational efficiency. Similar patterns and different census window sizes could also be used.

The LOG function is computed for a pixel by multiplying each pixel in its neighborhood by a coefficient, and summing the result, which is a positive or negative number.

Figure 4A:
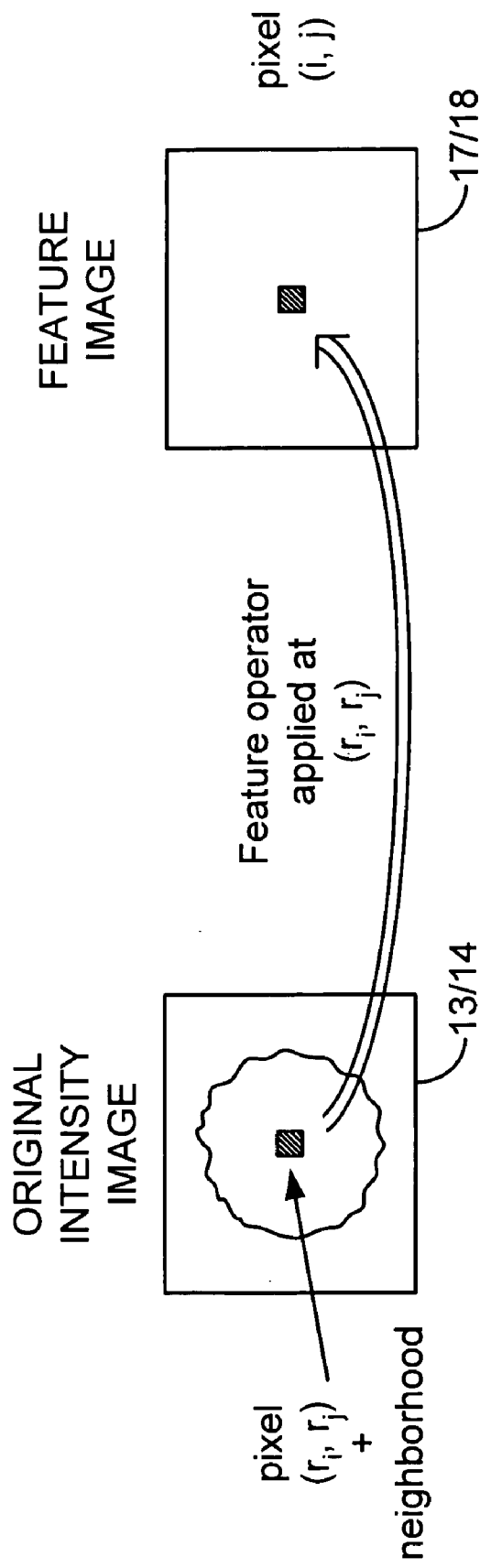
FIG. 4 provides a flow diagram that shows how rectification and feature extraction are combined in a single operation according to the invention.

Typically the rectification and feature extraction computations are considered as separate, successive operations. To increase efficiency, these operations are combined into a single operation in which the resulting feature image is computed by a single operation. The structure of this operation is presented in FIG. 4a.

The basic method is as follows:

Assume that the correspondence between (ri, rj) and (i,j) has already been computed according to methods cited in the above referenced papers. In its simplest form, the method herein disclosed applies the census or LOG operator to the neighborhood of (ri, rj), and stores the result at (i,j). This is an approximation to the original two-step rectification and feature extraction operations, because the values of some neighborhood pixels may be different in the rectified image. In practice, however, it has been found that this simple approximation works well.

A refinement of this concept is to use sub-pixel mapping between the rectified and original image. In this case, the original image coordinates (ri, rj) are not integers, but real numbers.

Because it is impossible to apply a feature operator at a non-integral pixel coordinate, the method herein described calculates a set of new operators that can be applied at the closest integral coordinate to (ri, rj), but approximate the calculation that would be performed at the fractional coordinate. To do this, it is necessary to pick a small number of fractional coordinates for which to compute the new operators. For concreteness, it is preferred to use the set F={0, ¼, ½, ¾}.

For the LOG operator, calculate coefficients for 16 fractionally-shifted operators. Let L(x,y) be the LOG function giving the coefficient at (x,y). The operators are given by the functions L(x−a, y−b), where a<F and b<F.

For the census operator described in Zabih supra., the situation is more complicated because the census bit vector is calculated using values at integer pixel coordinates.

Figure 4B:
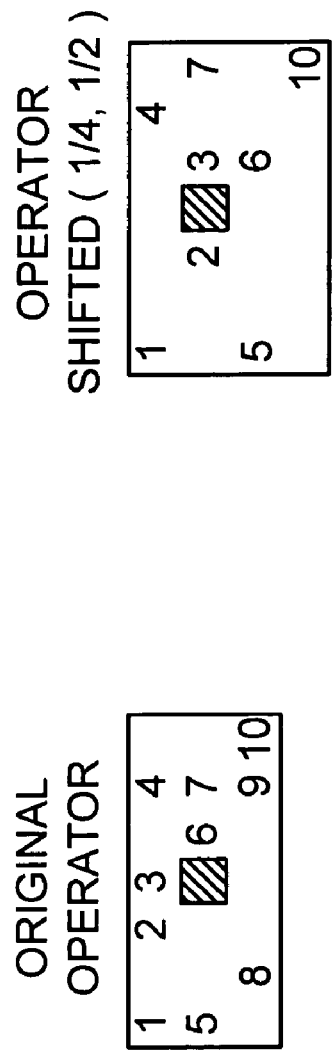

Form fractionally-shifted census operators from the original operator by shifting an appropriate percentage of the comparison pixels (FIG. 4b). For example, consider the fractional coordinate (¼, ½). Shift 25% of the comparison pixels to the right, and 50% of them down (some pixels may be shifted both right and down). When computing the bit-vector result, pixels that are shifted are compared to a shifted core pixel, e.g. if comparison pixel 3 is shifted right and down, it is compared to the pixel to the right and lower than the core pixel.

The fractional operators are used in the following manner:

The real-number coordinate (ri, rj) is truncated to the nearest integer coordinates (di, dj). Then the fractional operator closest to (ri−di, rj−dj) is chosen, and applied at (di, dj). The resultant feature value is stored at (i,j).

3. Moving-Average Correlation and Confidence

Figure 5:
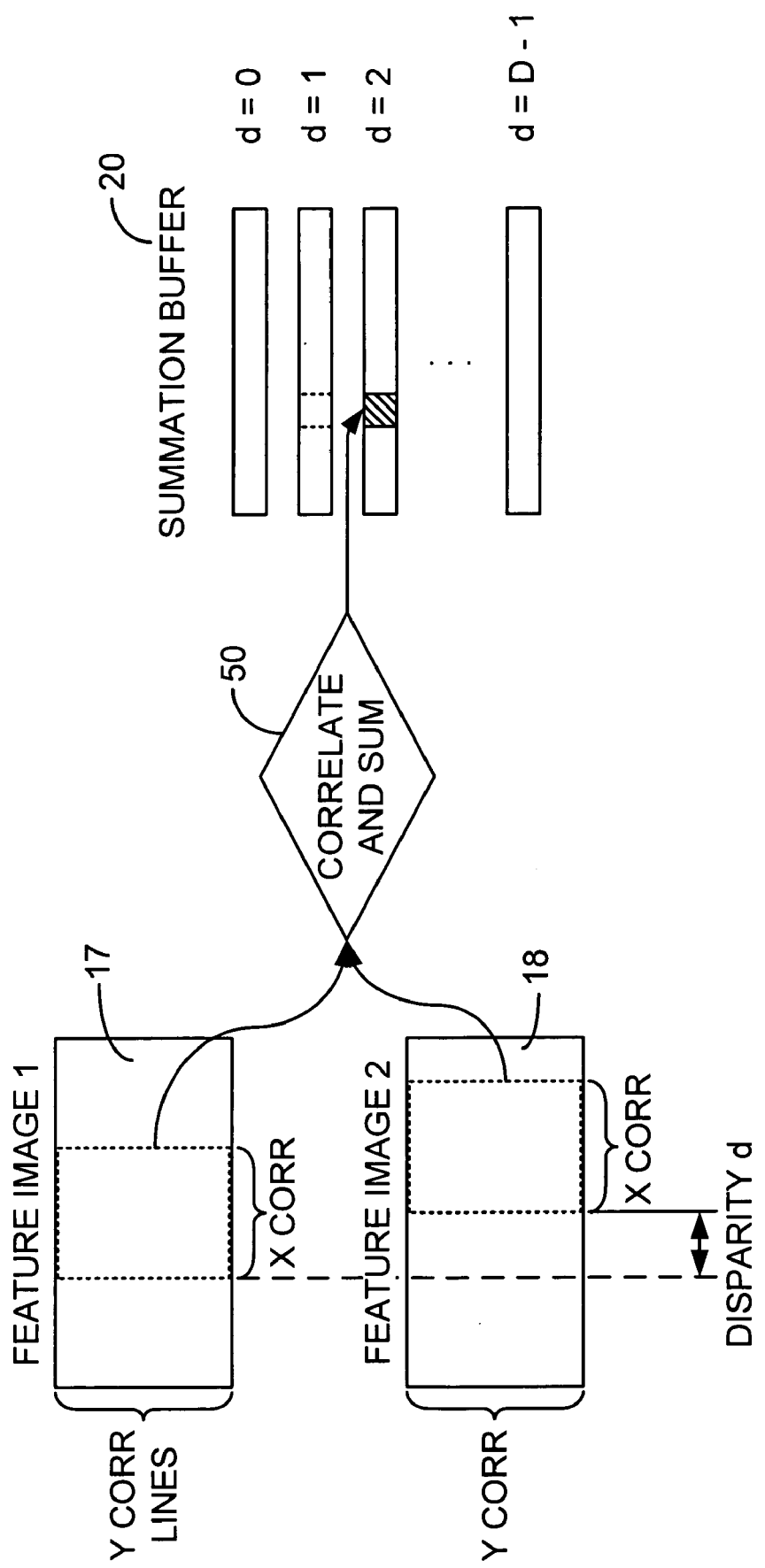
FIG. 5 provides a diagram that shows the structure of the summation buffer and the correlation and summation operations according to the invention.

FIG. 5 shows the structure of the summation buffer and its relation to the feature images. This step of the algorithm updates the summation buffer 20 with new results for each new line that is added to the feature images 17, 18. Assume that the size of the correlation window is XCORR (width) by YCORR (height). Suppose that the first YCORR lines have been computed in each feature image. Then for each disparity d<D there is a line of length N−XCORR+1 in the summation buffer, where each entry in the line holds the sum of correlations over the corresponding windows in the two feature images.

In the case of stereo, the disparities are horizontal offsets between the windows in feature image 1 and the windows in feature image 2. In the case of motion, the disparities range over vertical offsets as well, and the second feature image must have read in more lines in order to have windows with vertical offsets.

For each disparity, the summation buffer contains one line of length N−XCORR+1 that holds the correlation window sum at that disparity, for each window in feature image 1. The sum is computed 50 by first correlating the corresponding pixels in each of the two windows in the feature images, then summing the results. In the case of LOG features, the correlation between pixels is the square of the difference of their values. In the case of the census, the correlation is a count of the number of bits by which the two bit vectors differ.

Once all the values in the summation buffer are calculated, they are used as input to the final step of the algorithm to produce one line of the disparity image. Then a new line is computed for each of the feature images, the summation buffer is updated to reflect the new values, and another disparity image line is produced.

The computation of the correlation sums is computationally expensive, especially for typical window sizes of 11×11 or 13×13. Instead of computing these correlation window sums directly, the method herein described uses a variation of the well-known moving average technique to incrementally update the summation buffer. This incremental calculation involves two correlations, two subtractions, and three additions per summation buffer entry. It is diagrammed in FIG. 6.

Figure 6A:
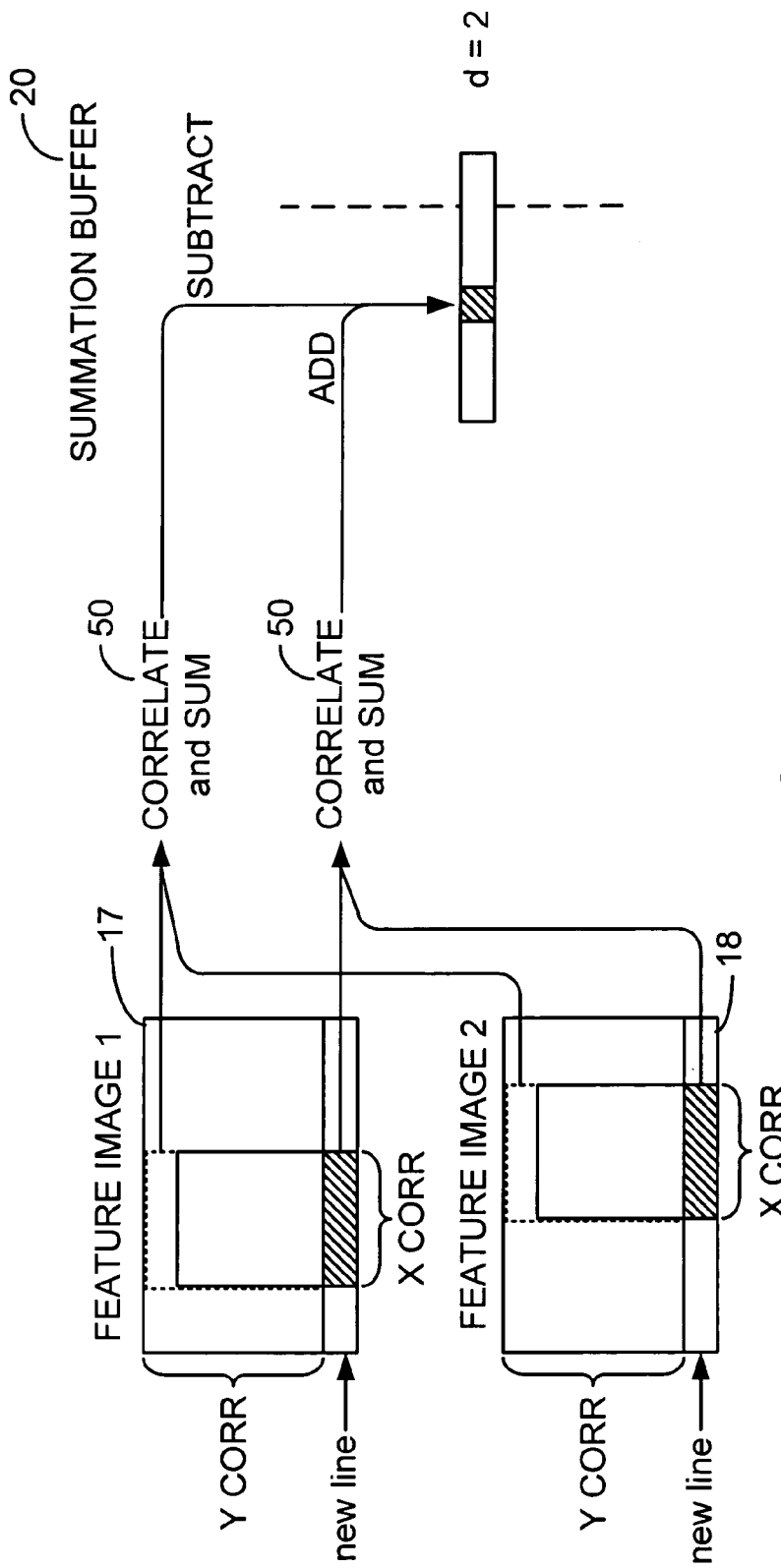
FIG. 6 provides a detailed view of the particular moving average calculation performed in the small vision module according to the invention.

FIG. 6a shows the basic structure. The shaded entry in the summation buffer 20 holds the summed correlation value for the two feature windows outlined by the dashed lines. A new line is computed for each feature image, and then the summation buffer value must be updated to the new windows, shown by solid lines. This involves adding in the correlations of the shaded feature pixels at the bottom of the new windows, and subtracting out the correlations of the pixels in the top row of the old windows.

Figure 6B:
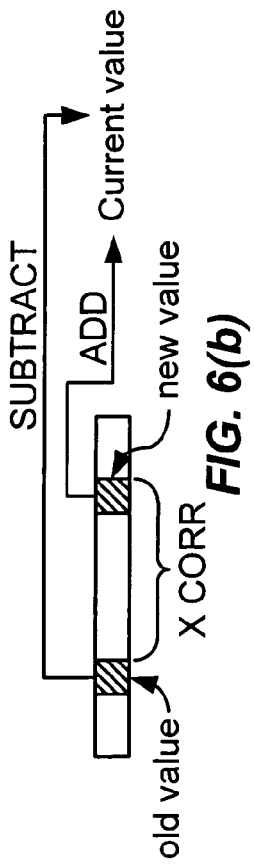

Summing the top and bottom row correlations can also be done incrementally, as shown in FIG. 6b. Here, use is made of a small buffer of size N−XCORR+1 for each of the top and bottom rows. As a new row pixel's correlation is computed, it is inserted into the XCORR buffer. At the same time, the current value of the row is updated by adding in the new value, and subtracting out the value stored at a position XCORR behind the new pixel. This computation is done for both the top and bottom rows. It should be noted that it is only necessary to store results for the YCORR+1 feature rows. It is not necessary to store previous correlation results. Thus, the invention provides a design that requires less storage capacity.

As stated, the update operation for a single entry in the summation buffer requires three subtractions and three additions. One of the subtractions can be eliminated by noting that it is unnecessary to keep a separate current value for both top and bottom rows, i.e. they can be merged into a single row that represents the difference between the top and bottom summations. This eliminates one of the subtractions.

This variation of the moving average procedure is particularly space-efficient because the only storage needed is the summation buffer, plus small line buffers for the top and bottom correlation results. By contrast, standard methods cache the results for all YCORR lines at all disparities, which requires a buffer of size (YCORR+1)*(N-XCORR+1)*D. The summation buffer requires only a buffer of size (N-XCORR+1)*D, plus the storage for the previous feature image lines, 2*YCORR*N. In hardware implementations of the algorithm, the reduced storage requirements are important because they allow the use of small, low-power embedded processors having limited memory.

In addition to calculating the windowed correlation sums, the method herein described also calculates an interest or confidence operator over the same window. There are many different types of interest operators in the literature (see, for example, M. Hannah, *Bootstrap Stereo*, Image Understanding, Defense Advanced Research Projects Agency, Report No. SAI-81-170-WA, pp. 201–208 (30 Apr. 1980); and H. Moravec, *Visual Mapping by a Robot Rover*, IJCHI, pp. 598–600 (1979)). Most of these techniques involve computing the edge energy in the neighborhood of a pixel, perhaps weighting the horizontal direction.

The method herein described uses a simple operator that has worked well in practice, i.e. |LOG|. This difference is calculated only for feature image 1, and is summed over the same window as is used for correlations. The results are stored in an additional line in the summation buffer, and updated for each new line that is added to feature image 1.

4. Disparity Computation and Confidence Threshold

After the summation buffer is updated, a final step in the algorithm produces one line of the disparity image result. The disparity image includes a threshold operation that eliminates low-confidence disparity values. Alternatively, the full disparity result and a separate confidence image could be returned, letting the end user decide which disparity values are valid.

Figure 7:
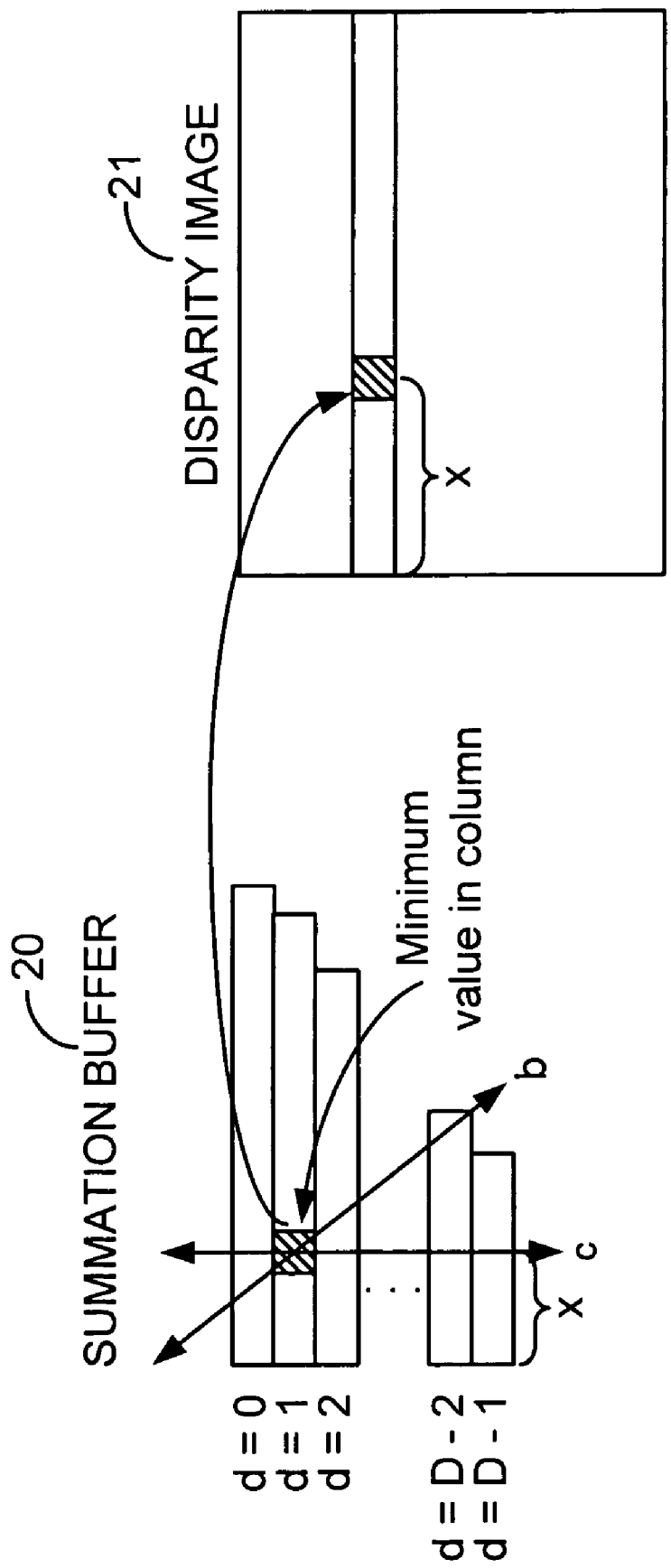
FIG. 7 provides a diagram that shows how the disparity image is formed from the summation buffer according to the invention.

FIG. 7 illustrates how disparity values are calculated from the summation buffer 20. For each column in the buffer, the minimum value is found (line c). The row at which this occurs is the disparity value that is stored in the corresponding column of the disparity image result.

It is possible to compute fractional pixel disparities by examining the values around the minimum, fitting a curve (usually a quadratic), and then choosing the fractional value corresponding to the peak of the curve (see, for example, S. Barnard, M. Fischler, *Computational Stereo*, Computing Surveys, Vol. 14, No. 4, pp. 553–572 (December 1982).

There are two checks that the algorithm performs. The first check is a left/right consistency check (see, for example, P. Fua, *A parallel stereo algorithm that produces dense depth maps and preserves image features*, Machien Vision and Applications (1993) 6:35–49); and M. Hannah, *SRI's Baseline Stereo System*, Image Understanding, Defense Advanced Research Projects Agency, Report No. SAIC-85/1149, pp. 1–7 (December 1985)).

Once the minimum value in a column is found, the set of values along the intersecting diagonal (line b) is checked to see if it is also a minimum among these values. If it is, then it passes the consistency test; if not, a no confidence value is placed in the disparity image. Note that it is not possible to perform the left/right check in calculating motion disparities, because not enough information is saved about vertical disparities in the summation buffer.

The second check is the confidence value generated by the interest operator. A high value for this value means that there is a lot of texture in the intensity images, and hence the probability of a valid correlation match are high. When the confidence value is low, the intensity of the image 1 neighborhood is uniform, and cannot be matched with confidence against image 2. The method herein described uses a threshold to decide when a disparity value has a high enough confidence. The threshold can be set by experimentation, and a good value depends on the noise present in the video and digitization system relative to the amount of texture in a pixel neighborhood.

5. Hardware Implementation

Figure 8:
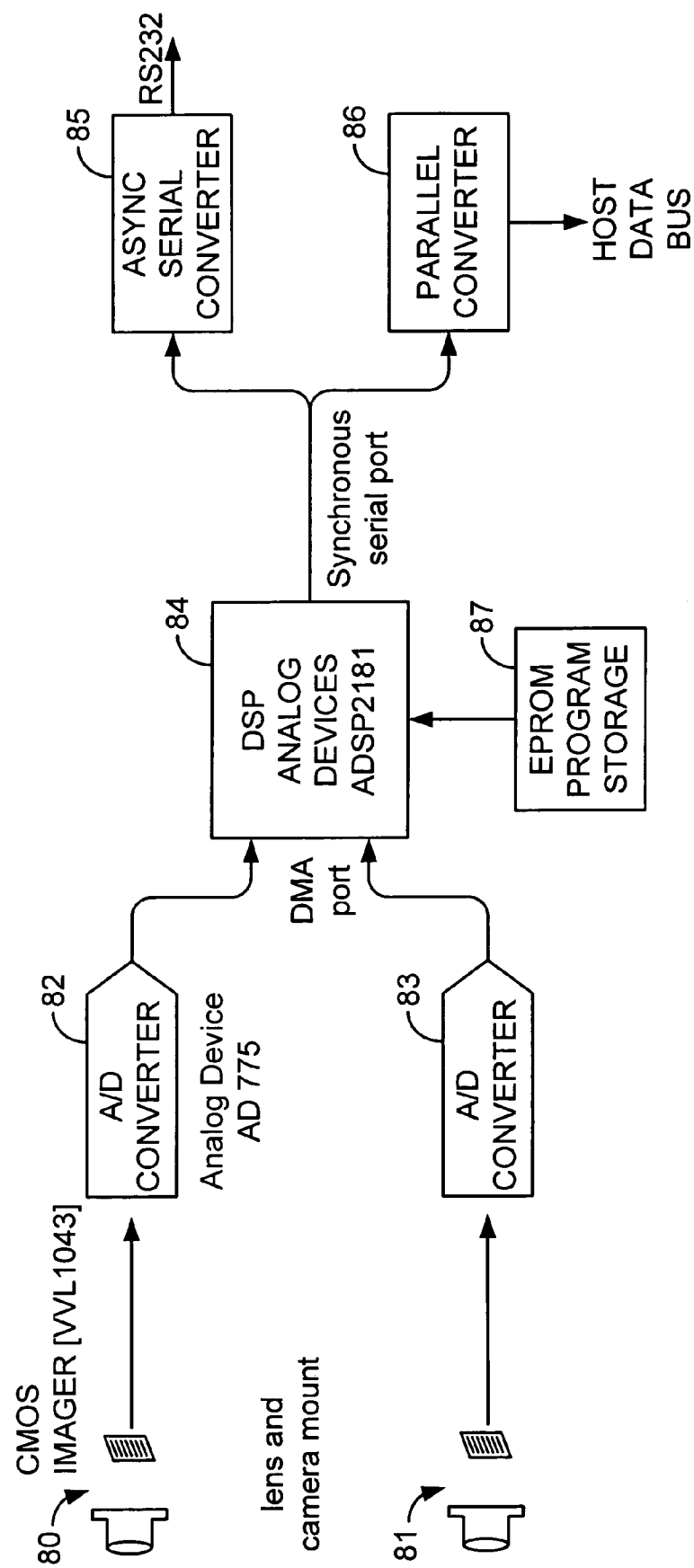
FIG. 8 is a block diagram that shows one hardware implementation of the small vision module according to the invention.

The invention herein provides a hardware and software implementation of the algorithm. The hardware implementation, diagrammed in FIG. 8, consists of two VVL1043 CMOS imagers and lenses 80, 81, two AD775 flash A/D converters 82, 83, an ADSP2181 digital signal processor 84 running at 33 MHz, and interface circuits 85, 86 for connecting the device to a host computer.

A lens and holder focus light from a scene onto the CMOS imaging surface of the VVL1043's. The imaging surface consists of 387×257 square pixels. The light energy is converted to an analog value for each pixel and clocked into the high-speed 8-bit flash converters, AD775's, at a rate of 60 320×240 fields per second. The DSP is an Analog Device ADSP2181 running at a clock speed of 33 MHz. It accepts this data stream at the rate of 2 pixels every 166 ns on its 16-bit IDMA port, and stores it in internal and external RAM. Two images are prepared for processing by the algorithm, either one image from each imager for stereo processing, or successive images from a single imager for motion processing. The DSP can process the images at the original resolution of 320×240, or decimate them to 160×120 or 80×60 before running the algorithm.

Results from the algorithm are produced incrementally, and are made available to the host computer as soon as they are ready. In the preferred embodiment of the invention, the inner loop is optimized for the ADSP2181, and takes 8 cycles (240 ns) per pixel per disparity. The feature comparison operation is also optimized for the processor, and uses four bits for each LOG value. The speed of processing is 8.3 fields per second at 160×100 resolution and 16 disparities. This figure is the total data rate, including all I/O between the vision module and the host processor.

Code for the algorithm is stored in an external ROM 87, and loaded into the DSP when it boots up.

The system requires low-power and occupies a small space. The complete vision module fits on a 2"×3" circuit board, and has a height of 1." Power consumed while operating at full speed is 1.5 watts.

The preferred embodiment of the algorithm is implemented on small, low-power embedded processors having limited memory resources. There are or there could be many different hardware incarnations of the algorithm. The preferred embodiment of the invention herein disclosed is efficient both in terms of the size, the speed, and the power consumed, and is thought to have the best figure of merit of any stereo or motion processor in terms of both power and speed at this point. Some of the hardware described herein could be substituted with different types of hardware and still satisfy the same or similar criteria.

The device is produced in a very small package that uses video sensors, which are fairly new technology. They are CMOS imagers, as opposed to CCD imagers, and provide both an analog signal that represents the intensity values and, at the same time, also provide a pixel clock.

Furthermore, they are integrated onto single chips and therefore require very low power. By way of comparison, typical CCD's require a lot of driver circuitry to do the same thing and consume much more power. The imagers are made by VVL in England. The imagers put out a 320×240 picture every 60th of a second, along with a pixel clock. For motion field calculations, the method herein described uses the output from a single imager, and looks at two successive images.

The images are synchronized by using a common clock for both chips and they are fed to two analog-to-digital converters. These are Analog Device's 775 AD flash converters which produce 8 bits per pixel every 166 nanoseconds. The two signals are fed directly into a DSP processor that has enough memory to hold a reduced version of those pictures. The pictures are averaged down from 320×240 to 160×120 so that they fit in the internal memory of the DSP processor. The processor is an Analog Device's DSP chip That chip by itself has enough memory and peripheral processing power to be able to do all of the steps of the algorithm. It operates at a basic rate of about 8 frames per second, computing a 160×120 disparity result at this rate. On the back end of the DSP processor there are several interface circuits that actually take the results of the DSP processor and output same over a bus to the parallel or serial port of a computer. There are other interfaces that could be used, for instance, through PCI buses or other standard industry buses.

Programs for the DSP are stored in a small (32 kB) EPROM that is read in to the DSP when it boots up.

One of the benefits of the particular algorithms used herein is that they can be optimized for typical types of DSP architectures which use circular buffers, no overhead indexing, and fast single-cycle multiply. For the LOG operator, a fast multiplication operation is important. The basic figure of merit for this DSP processor is 8 processor cycles per pixel per disparity, regardless of the size of the correlation window.

Uses of the invention include, for example people-tracking, surveillance, industrial pick-and-place, extra-terrestrial exploration, transportation sensors, and military sensors.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. An apparatus for performing area correlation on a first feature image and a second feature image, each feature image including a plurality of lines, the apparatus comprising:
   one or more buffers capable of storing at least part of each feature image;
   a window summation buffer; and
   a processor capable of:
      obtaining a line from each feature image;
      computing a correlation of the two lines at a plurality of disparities;
      storing the results of the correlation in the window summation buffer;
      using the information stored in the window summation buffer to compute a new line in a disparity image; and
   obtaining successive lines of each of said feature images and updating said window summation buffer.

2. The apparatus of claim 1, wherein the processor is further capable of computing two minimum values from the information stored in the window summation buffer to perform a left/right consistency check.

3. The apparatus of claim 1, wherein the processor is further capable of computing fractional pixel disparities.

4. The apparatus of claim 1, wherein the processor is further capable of computing a confidence value.

5. An apparatus as recited in claim 1, wherein said processor is further capable of rectification and feature extraction, and wherein said rectification and feature extraction proceed in parallel with said correlation.

6. An apparatus as recited in claim 1, wherein said window summation buffer has size N×(D+1), where D is the number of different disparities that are checked for each pixel in said feature images, where for each disparity $0<=d<D$ there is a line of size N in said window summation buffer, where each value in said line is the correlation of said window centered on a corresponding pixel in said first feature image to said window centered on a corresponding pixel offset by the disparity d in said second feature image.

7. An apparatus for performing area correlation on a first and a second feature images using a first and a second correlation windows of size X pixels by Y lines, where Y is less than 10% of the total number of lines in either feature image, and X is less than 10% of the total number of pixels in a line of either feature image, the apparatus comprising:
   a first buffer capable of storing more than Y but less than 3Y lines of the first feature image;
   a second buffer capable of storing more than Y but less than 3Y lines of the second feature image;
   a window summation buffer; and
   a processor capable of:
      correlating, at a plurality of disparities, corresponding lines in the first and the second correlation windows;
      storing the results of the correlation in the window summation buffer;
      using the information stored in the window summation buffer to compute a new line in a disparity image; and
      obtaining successive lines of each of said feature images and updating said window summation buffer.

8. The apparatus of claim 7, wherein the processor is further capable of computing two minimum values from the information stored in the window summation buffer to perform a left/right consistency check.

9. The apparatus of claim 7, wherein the processor is further capable of computing fractional pixel disparities.

10. The apparatus of claim 7, wherein the processor is further capable of computing a confidence value.

11. A method for performing area correlation on a first feature image and a second feature image using a window summation buffer to cache partial results, each feature image including a plurality of lines, the method comprising the steps of:
- obtaining a line from each feature image;
- computing a correlation of the two lines at a plurality of disparities;
- storing the results of the computing in the window summation buffer;
- using the information stored in the window summation buffer to compute a new line in a disparity image; and
- obtaining successive lines of each of said feature images and updating said window summation buffer.

12. The method of claim 11, further comprising the step of computing two minimum values from the information stored in the window summation buffer to perform a left/right consistency check.

13. The method of claim 11, further comprising the step of computing fractional pixel disparities.

14. The method of claim 11, further comprising the step of computing a confidence value.

15. A method for performing area correlation on a first and a second feature images using a first and a second correlation windows of size X pixels by Y lines, where Y is less than 10% of the total number of lines in a feature image, and X is less than 10% of the total number of pixels in a line of a feature image, the method comprising the steps of:
- storing more than Y but less than 3Y consecutive lines of the first feature image in a first buffer;
- storing more than Y but less than 3Y consecutive lines of the second feature image in a second buffer;
- correlating, at a plurality of disparities, corresponding lines in the first and the second correlation windows;
- storing the results of the correlating in a window summation buffer;
- using the information stored in the window summation buffer to compute a new line in a disparity image; and
- obtaining successive lines of each of said feature images and updating said window summation buffer.

16. The method of claim 15 further comprising the step of computing two minimum values from the information stored in the window summation buffer to perform a left/right consistency check.

17. The method of claim 15, further comprising the step of computing fractional pixel disparities.

18. The method of claim 15, further comprising the step of computing a confidence value.

19. A computer readable medium encoded with a computer program for performing area correlation on a first feature image and a second feature image using a window summation buffer to cache partial results, each feature image including a plurality of lines, the computer program comprising for:
- obtaining a line from each feature image;
- computing a correlation of the two lines at a plurality of disparities;
- storing the results of the computing in the window summation buffer;
- using the information stored in the window summation buffer to compute a new line in a disparity image; and
- obtaining successive lines of each of said feature images and updating said window summation buffer.

* * * * *